United States Patent [19]

Veenstra

[11] Patent Number: 5,136,449
[45] Date of Patent: Aug. 4, 1992

[54] SHUTTER STOP MECHANISM FOR DISK CARTRIDGES

[75] Inventor: Kevin C. Veenstra, St. Paul, Minn.

[73] Assignee: Minnesota Mining and Manufacturing Company, St. Paul, Minn.

[21] Appl. No.: 565,692

[22] Filed: Aug. 13, 1990

[51] Int. Cl.$^5$ ............................................. G11B 23/03
[52] U.S. Cl. ................................................... 360/133
[58] Field of Search ........................................ 360/133

[56] References Cited

U.S. PATENT DOCUMENTS 4,945,530 7/1990 Sandell ............................. 360/133 X
5,034,844 7/1991 Shiba ................................... 360/133

FOREIGN PATENT DOCUMENTS 0218231 4/1987 European Pat. Off. .
0264237 4/1988 European Pat. Off. .

Primary Examiner—A. J. Heinz
Attorney, Agent, or Firm—Gary L. Griswold; Walter N. Kirn; Charles D. Levine

[57] ABSTRACT

A disk cartridge including a rotatable disk, a cartridge case for housing the disk, and a U-shaped shutter slidably disposed on the front edge of the cartridge case is disclosed. The cartridge case includes upper and lower walls, and a head access opening formed in both walls between a central axis and the front edge to access the disk. The access opening is opened and closed by the shutter which is biased closed. An indented portion is formed on the walls for receiving the shutter. The arm portion of each edge at the side toward which the shutter is biased serves as a stop for the shutter when the shutter is biased in the closed position. The front edge forming a border of at least one indented portion and adjacent the stop is recessed to provide a second stop. The shutter includes a wall portion adjacent the base of the U and adjacent the arm of the U mounted on the wall of the cartridge having the second stop. This wall portion abuts the second stop when the shutter is closed.

6 Claims, 2 Drawing Sheets

SHUTTER STOP MECHANISM FOR DISK CARTRIDGES

TECHNICAL FIELD

The present invention relates to rigid disk cartridges. More particularly, the present invention relates to shutter stop mechanisms for magnetic or optical diskette cartridges.

BACKGROUND OF THE INVENTION

Rigid recording disk cartridges having a circular, floppy magnetic or optical disk rotatably mounted within the disk cartridge case are well known. The cartridge is mountable on a disk drive apparatus to rotate the recording disk and access the disk by a magnetic or optical recording head for recording or reproducing information. The disk cartridge includes a rotatable magnetic or optical disk, a cartridge case for housing the magnetic disk having a central axis and a front peripheral edge, and a U-shaped shutter slidably disposed on the front peripheral edge of the case.

The cartridge case includes generally rectangular upper and lower walls which mate to form the outer dimensions of the cartridge case. A drive shaft opening is formed through a central portion of the lower wall to receive a drive shaft to rotate the magnetic disk within the cartridge case. A head access opening is formed in both the upper and lower walls between the central axis and the front peripheral edge to access the magnetic disk. The head access opening is opened and closed by the shutter which slides between open and closed positions. A spring biases the shutter in the closed position to cover and close the head access opening. When the cartridge is inserted into the disk drive, the shutter is moved to the open position by the disk drive to provide access to the disk. The shutter may also include one or more tabs which ride in a slot in the wall of the cartridge to guide the shutter.

A shallow indented portion is formed on both the upper and lower walls for receiving the shutter. Each indented portion is defined by a U-shaped edge on a respective wall. The portion of each U-shaped edge at the side toward which the shutter is biased serves as a stop for the shutter when the shutter is biased closed. However, when the cartridge is removed from a disk drive and the shutter is biased to its closed position, the shutter tends to slide past the edge as there is not sufficient interference between the edge and the shutter. This problem is particularly acute with plastic shutters, which deform more easily than metal shutters. When the cartridge is next inserted into the disk drive, the displaced shutter may interact incorrectly with the drive, which can result in damage to the cartridge and data loss.

This shutter displacement frequently results from the cartridge being dropped during handling. One edge of the shutter can ride over the U-shaped edge to encompass the thicker portion of the case. This can prevent the shutter from opening upon insertion into the disk drive or prevent the cartridge from loading into the drive.

European Patent Application Publication No. 264,237 discloses a disk cartridge in which the shutter can slide to either side of the head access opening. Abutting plates 35A and 35B serve as anchoring points for opposing torsion springs which push the shutter toward the center of the cartridge to close the cartridge. The shutter does not stop against the cartridge and these plates do not extend to the ends of the shutter slide area as the shutter must be able to slide to both sides of the head access opening.

European Patent Application Publication No. 218,231 discloses a disk cartridge in which the shutter stops against a stopper 5 to prevent the shutter from opening inadvertently. However, the stopper does not work with the shutter engagement mechanism used in 3.5 inch microfloppy disk cartridge drives. With 3.5 inch disk cartridges and drives, an engagement pin in the drive slides the shutter open from right to left, as viewed from above, as the cartridge is inserted in the drive. As the cartridge is ejected from the drive, a torsion or extension spring forces the shutter to the right until it contacts a vertical ridge approximately 0.203 mm (0.008 in) to 0.356 mm (0.014 in) deep in the cartridge case. The ridge stops the shutter and the shutter is held against the ridge by the spring. This ridge is small relative to the shutter and cartridge manufacturing tolerances. If the shutter is too wide and the mechanical interference between the shutter and the cartridge is too small, the shutter can override the ridge and becomes stuck on the cartridge. When the shutter is next inserted into the drive, the engagement pin cannot open the shutter and the cartridge will not function and may stick in the drive. With resin-based shutters, the probability of shutter override is greater as the flexural modulus for resins is much lower than for steels.

Neither of these disclosures addresses the problem of preventing shutter misalignment in 3.5 inch microfloppy disk cartridge drives. There is a need for a shutter stop mechanism which prevents such shutter misalignment.

SUMMARY OF THE INVENTION

The present invention improves on the shutter stop devices of known disk cartridges using 3.5 inch microfloppy disk cartridge drives by providing a greater interference between the shutter and the shutter stop. The disk cartridge includes a rotatable magnetic disk, a cartridge case for housing the magnetic disk having a central axis and a front peripheral edge, and a U-shaped shutter slidably disposed on the front peripheral edge of the cartridge case. The cartridge case includes a generally rectangular upper wall and a generally rectangular lower wall which mate to form the outer dimensions of the cartridge case. A drive shaft opening is formed through a central portion of the lower wall and receives a drive shaft to rotate the magnetic disk within the cartridge case. A head access opening is formed in both the upper and lower walls between the central axis and the front peripheral edge to provide access to the magnetic disk. The head access opening is opened and closed by the shutter which has an opening which registers therewith. A spring biases the shutter closed.

An indented portion is formed on both the upper and lower walls for receiving the shutter. Each indented portion is defined by the front peripheral edge of the cartridge case and a U-shaped edge on a respective wall. The U-shaped edge includes two arm portions and a base portion interconnecting the arm portions. The arm portion of each U-shaped edge at the side toward which the shutter is biased serves as a stop for the shutter and contacts the edge of the shutter when the shutter is in the closed position. The front peripheral edge adjacent the arm portion of the U-shaped edge toward which the shutter is biased is recessed. The recess extends from a wall which provides another stop for the shutter. The shutter includes a wall portion adjacent the base and the arms of the U which abuts the wall of the front peripheral edge recess when the shutter is biased in the closed position. Alternatively, the recess can be formed on only one of the upper and lower walls, and the arm portion need only be formed on the shutter adjacent the shutter arm mounted on the wall of the cartridge having the recess.

DETAILED DESCRIPTION OF PREFERRED EMBODIMENTS

Figure 1:
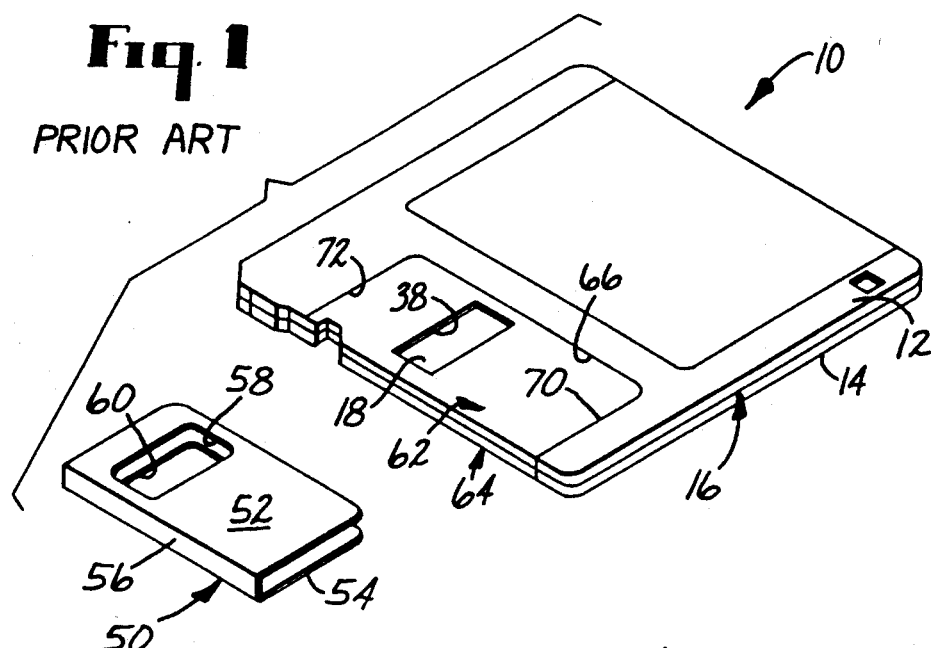
FIG. 1 is a perspective view of a prior art disk cartridge.
Figure 2:
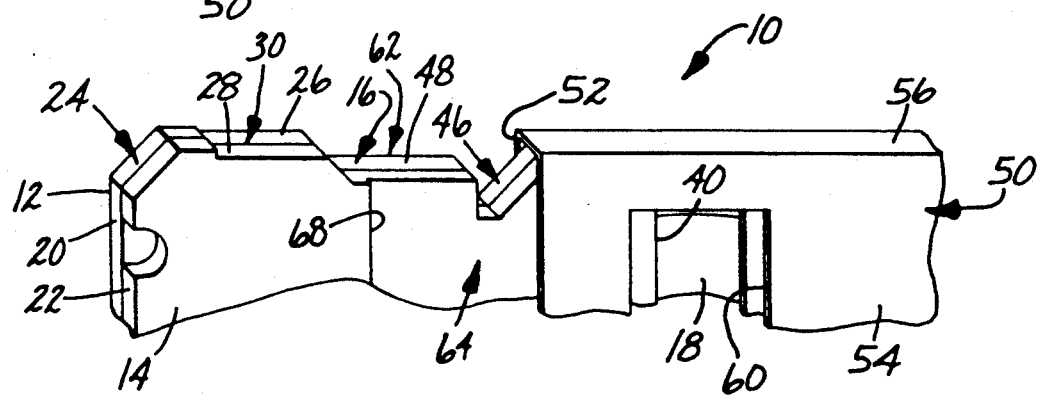
FIG. 2 is a top perspective view of the prior art disk cartridge of FIG. 1 showing the front peripheral edge.

A 3½ inch rigid disk cartridge is illustrated in the figures and described below. Nonetheless, it is envisioned that the present invention could also be adapted for and used with 5¼ inch disk cartridges, 2 inch disk cartridges, or other sized cartridges in which shutters can be used. Referring to FIGS. 1 and 2, which illustrate prior art 3.5 inch microfloppy disk cartridges, the cartridge 10 includes an upper case wall 12 and a lower case wall 14 which are substantially identical in shape and mate to form a thin, substantially rectangular case 16. The case 16 is preferably formed of a rigid plastic material such as injection molded ABS resin. A circular floppy disk 18 formed of a magnetizable composition and having a circular central hub typically formed of metal is rotatably mounted within the case 16 between two circular nonwoven pads or wipers (not shown) which serve as shock absorbers and cleaners for the disk 18. Each wiper contacts the disk surfaces to wipe debris from the disk 18 and permit the disk 18 to rotate without interference from the case walls 12, 14.

Peripheral edge walls 20, 22 extend perpendicularly from the upper and lower case walls 12, 14, respectively, and form the side walls 24 of the case 16 and an interior pocket for the disk 18. A front portion of the edge wall 20 is the front peripheral edge 26, while a front portion of the edge wall 22 is the front peripheral edge 28. These front peripheral edge walls 26, 28 combine to form the case front edge wall 30. The lower case wall 14 has a central opening 36 aligned with a central axis of the disk 18 for receiving a drive shaft of a disk drive apparatus (not shown) to rotate the disk 18 within the case 16.

The upper and lower case walls 12, 14 also have elongated, generally rectangular access openings 38, 40 located between the central axis of the case 16 and the front edge wall 30. The access openings 38, 40 permit a read-write head (not shown) of the disk drive apparatus to access the disk 18. A groove 46 is provided on the front edge wall 30 between the access openings 38, 40 and the left side of the case. When the cartidge 10 is inserted into a disk drive, a shutter actuation pin (not shown) contacts the front edge wall 30 in recess 48 and slides to the left, as viewed from the top, opening a U-shaped shutter 50 until the actuation pin stops in groove 46. A portion of the front edge wall 30 is recessed 48 to provide access for the shutter actuation pin.

A U-shaped shutter 50 is slidably disposed on the front edge wall 30 of the cartridge case 16 and is movable between an open and a closed position. The shutter 50 may be metal or plastic and includes an upper arm 52, a lower arm 54, and a base portion 56 which interconnects the upper and lower arms 52, 54. The upper arm 52 has an opening 58 and the lower arm 54 has an opening 60. Upper arm opening 58 registers with the upper head access opening 38 and the lower arm opening 60 registers with the lower head access opening 40 to permit access to the disk 18 by the read-write head when the shutter is in the open position. The shutter 50 slides over a sliding surface formed by an upper indented portion 62 and a lower indented portion 64. The indented portion 62 is bordered on three sides by a U-shaped edge 66, and the indented portion 64 is bordered on three sides by a U-shaped edge 68. The shutter may also include tabs (not shown) which ride within grooves (not shown) on the sliding surface.

In the closed position, the left edge of the shutter 50 is disposed against the left arm 70 of the U-shaped edge 66 as shown in FIG. 2. In the open position, the right edge of the shutter 50 is disposed against the right arm 72 of the U-shaped edge 66. The shutter is biased in the closed position by a spring (not shown). When the shutter 50 moves from the open to the closed position, the left edge of the shutter 50 should be stopped by the left arm 70 of the U-shaped edge 66. However, as discussed above, the shutter 50 tends to slide past the left arm 70 as there is not sufficient interference between the arm 70 and the shutter 50.

Shutter drop, both vertical and horizontal, describes damage to or disengagement of the shutter 50 from the case 16 when the cartridge 10 is dropped during handling. This damage is more common with plastic shutters 50. Vertical shutter drop occurs when the cartridge 10 is dropped directly on the shutter 50. Disengagement can be prevented and damage can be mitigated by increasing the interference between any shutter tabs and complementary sliding surface grooves. Horizontal shutter drop occurs when the cartridge 10 is dropped parallel to the sliding direction of the shutter 50. Failure is embodied by the left edge of the shutter 50 riding over the left arm 70 of the U-shaped edge 66 to encompass the thicker portion of the case 16 adjacent the indented portions 62, 64. This increases the force required to slide the shutter 50 along the cartridge 10, possibly to a level exceeding that which can be provided by the shutter actuation pin, thus preventing the shutter 50 from opening and the cartridge 10 from loading into the drive. This failure can be prevented by increasing the interference between the case 16 and the shutter 50 to increase the deflection required to bend the shutter 50. It has been found that this can be accomplished by thickening the case 16, squaring the boundaries of the indented portions 62, 64, or narrowing the internal clearance of the shutter 50. However, further improvements are desired to prevent shutter drop.

Figure 3:
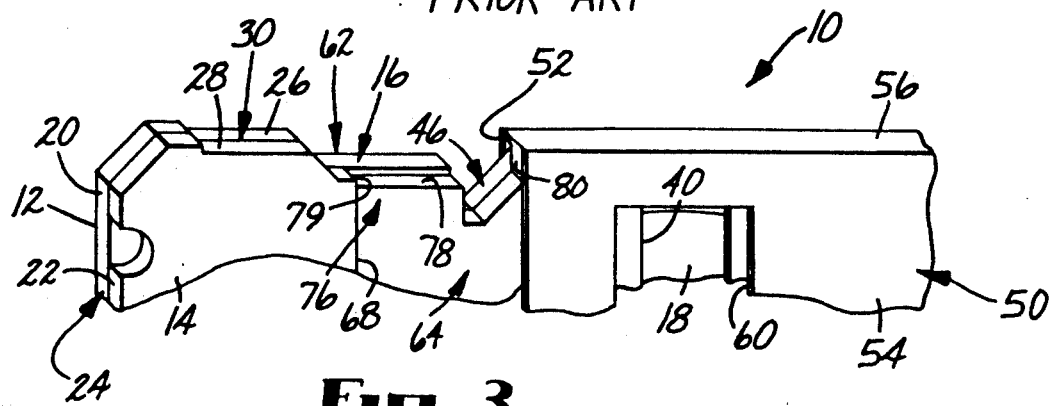
FIG. 3 is a top perspective view of a disk cartridge according to the present invention showing the front peripheral edge.
Figure 4:
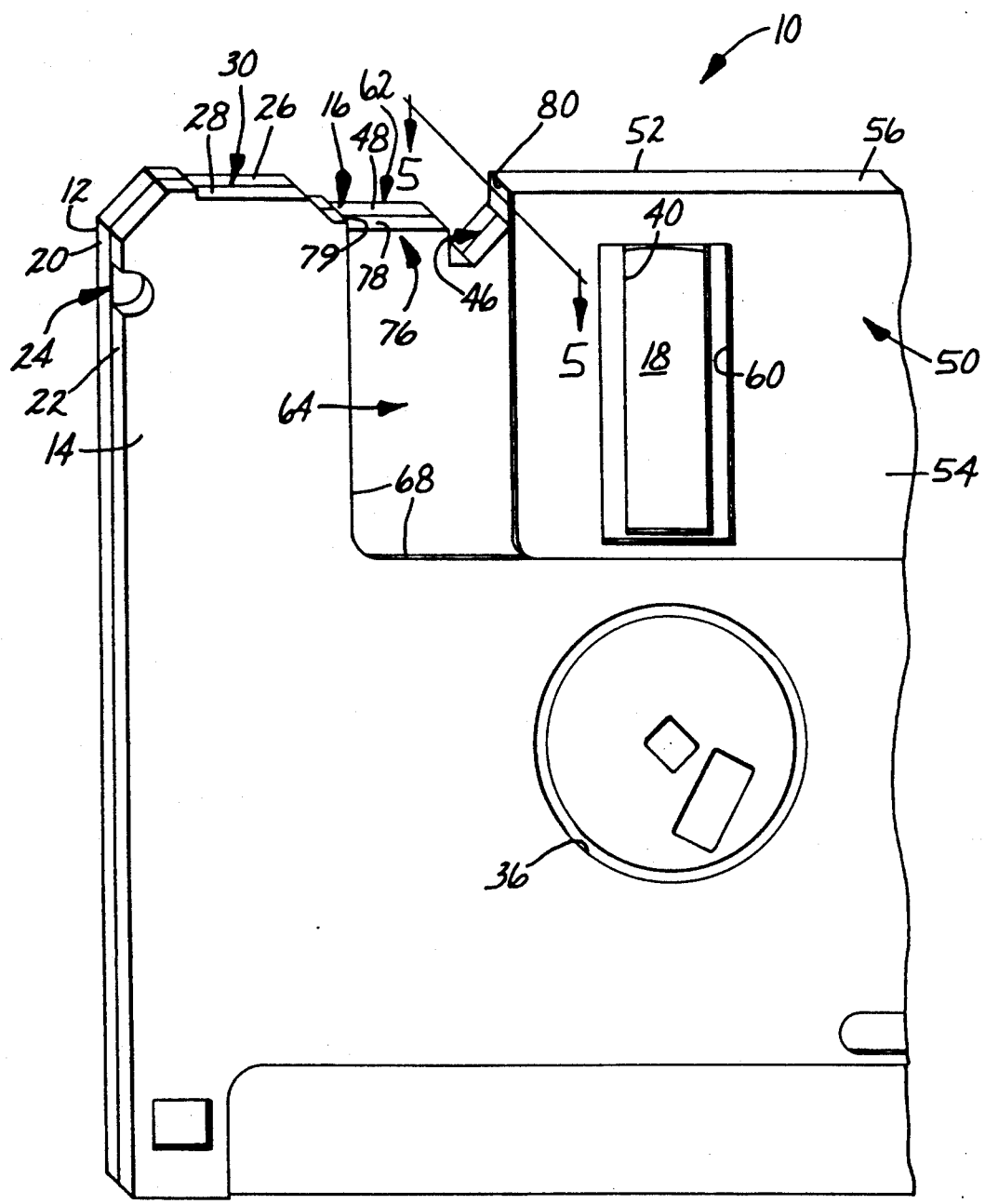
FIG. 4 is a top perspective view of a disk cartridge according to another embodiment of the present invention showing the front peripheral edge.
Figure 5:
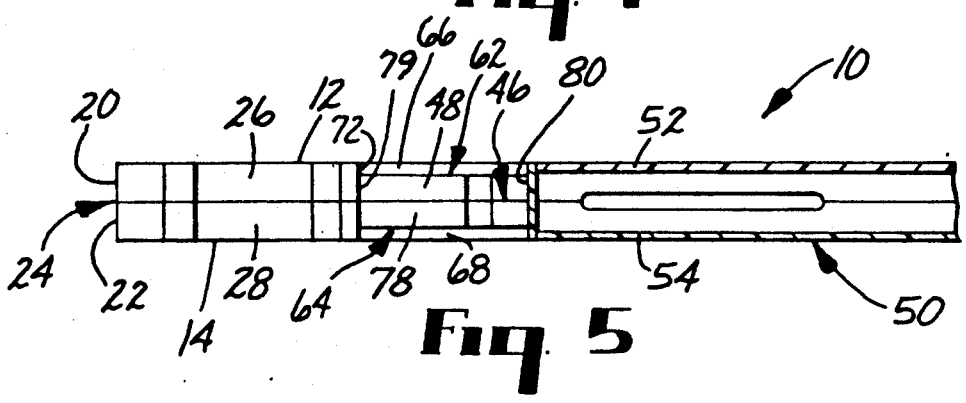
FIG. 5 is a sectional view of the disk cartridge of FIG. 4 taken along line 5—5 of FIG. 4.

This is accomplished by providing another stop 76. The stop 76 includes forming an additional recess 78 on a portion of the case recess 48 on the front edge wall 30. As shown in FIG. 3, this recess 78 extends between the end of groove 46 and the left arm 70 of the U-shaped edge 66. The junction of the recess 78 and the left arm 70 of the upper U-shaped edge 66 forms wall 79 of the stop 76. As shown in FIG. 3, this recess 78 extends across only the upper front peripheral edge 26 although as shown in FIGS. 4 and 5, the recess 78 can extend across both front peripheral edges 26 and 28, or only the lower front peripheral edge 28 (not shown).

The shutter 50 also includes a wall portion 80 adjacent the base portion 56 of the U and connecting the arms 52, 54 of the U. The wall portion 80 abuts the wall 79 when the shutter 50 is in the closed position, but does not interfere with movement of the shutter 50 to open the head access openings 38, 40 as the wall portion 80 rides within the recess 78. The interference provided by the wall portion 80 butting against wall 79 is sufficient to prevent the shutter 50 from riding over the left arm 70 of the U-shaped edge 66 to encompass the thicker portion of the case 16 adjacent the indented portions 62, 64, even when the cartridge 10 is dropped from heights of greater than 30 cm.

Referring to FIG. 3, the recess 78 extends across the lower front peripheral edge 28 and the wall portion 80 is adjacent the shutter base portion 56 and the arm 54. It is preferred that the recess 78 extend across only one of the front peripheral edges 26, 28 and the wall portion 80 be adjacent the shutter base portion 56 and only the corresponding arm 52, 54 mounted on the respective peripheral edge 26, 28 having the recess 78. This would maintain the cartridge within ANSI standards. Alternatively, as shown in FIGS. 4 and 5, the recess 78 extends across both front peripheral edges 26, 28 and the wall portion 80 extends along the shutter base portion 56 from one shutter arm 52 to the other shutter arm 54. Where the recess 78 is formed in the upper front peripheral edge 26 and the wall portion 80 is formed adjacent the upper arm 52, the shutter engagement pin will not ride up over and catch on the top of the lower case wall 14. Additionally, the recess 78 can be partial, angled, or radiused to provide additional mechanical interference for the wall portion 80 without providing a horizontal surface on which the shutter engagement pin can catch. The lower case wall 14 edge could extend further than the parting line separating the upper case wall 12 from the lower case wall 14. This would prevent the shutter engagement pin from catching on the lower case wall 14 since the height of the lower case wall 14 would be higher than the height of the bottom of the shutter engagement pin.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, although magnetic disks have been described for simplicity, the invention can be used with optical and other media disks as well.

I claim:

1. A substantially flat rigid disk cartridge comprising:
   a rotatable disk;
   a cartridge case for housing the rotatable disk having a central axis and a front peripheral edge, and comprising generally rectangular upper and lower walls mating to form the outer dimensions of the cartridge case; a drive shaft opening formed through one of the upper or lower walls to receive a drive shaft to rotate the disk within the cartridge case; and an access opening formed in at least one of the upper and lower walls between the central axis and the front peripheral edge for providing access to the disk;
   a U-shaped shutter having an upper arm, a lower arm, and a base portion interconnecting the upper and lower arms, the shutter being mounted on the cartridge case to open and close the access opening, wherein the shutter is disposed on the front peripheral edge of the cartridge case such that the upper arm, lower arm, and base portion all reside outside of the cartridge case with the upper arm of the U disposed against the upper wall, the lower arm of the U disposed against the lower wall, and the base portion of the U disposed against the front peripheral edge, wherein the shutter is slidable between a single open position and a single closed position and wherein the upper arm, lower arm, and base portion are formed together as one piece without assembly;
   means for biasing the shutter in the closed position; and
   means for stopping movement of the shutter when the shutter is biased in the closed position to prevent misalignment of the shutter, the stopping means comprising:
   a shutter stop wall which defines the furthest point of travel of the shutter toward the closed position to provide a first shutter stop;
   a recess formed in the front peripheral edge of at least one of the cartridge walls and extending from the shutter stop wall; and
   a wall portion formed on the U-shaped shutter adjacent the base of the shutter and projecting into the space defined between the upper and lower arms such that the wall portion rides in the recess and abuts the first shutter stop when the shutter is closed.

2. The disk cartridge of claim 1 wherein the wall portion is formed adjacent at least one arm of the shutter.

3. The disk cartridge of claim 1 wherein the recess is formed in both the upper and lower front peripheral edges and the wall portion is formed adjacent the base of the shutter and connects the arms of the shutter.

4. The disk cartridge of claim 1 wherein the stopping means further comprises a shutter receiving edge formed on at least one of the cartridge walls on the side of the access opening toward which the shutter is biased to contact one shutter arm and provide a second shutter stop.

5. The disk cartridge of claim 4 further comprising an indented portion formed on both the upper and lower cartridge walls for receiving the shutter, wherein at least one indented portion is defined in part by the shutter receiving edge, and wherein the wall which provides the first shutter stop forms part of the shutter receiving edge.

6. The disk cartridge of claim 1 further comprising an indented portion formed on both the upper and lower cartridge walls for receiving the shutter, wherein each indented portion is defined by a U-shaped edge having an arm on the side of the access opening toward which the shutter is biased to contact the shutter arms and provide a second shutter stop, wherein the wall which provides the first shutter stop forms part of the U-shaped edge forming the second shutter stop.

* * * * *